United States Patent

[11] 3,578,052

[72] Inventor Aivars V. Petersons
 1925 Little York Road, Dayton, Ohio 45414
[21] Appl. No. 760,931
[22] Filed Sept. 19, 1968
[45] Patented May 11, 1971

[54] REPLACEABLE TREAD ON AN EXPANDING DIAMETER CAR CARCASS TIRE
 2 Claims, 11 Drawing Figs.
[52] U.S. Cl. ................................................ 152/187
[51] Int. Cl. ............................................ B60c 11/02
[50] Field of Search ................................... 152/176, 187, 175

[56] References Cited
 UNITED STATES PATENTS
 3,224,482 12/1965 Barassi et al. ................. 152/176
 FOREIGN PATENTS
 547,958 10/1957 Canada ........................ 152/171

Primary Examiner—James B. Marbert
Attorneys—Harry A. Herbert, Jr. and Charles H. Wagner ABSTRACT: A vehicle tire which provides a simple means of mounting, dismounting, or exchanging tire treads. The tire carcass is designed in such a manner that the diameter increases by 15 percent or more when the tire is inflated to operating or operable pressure. On the carcass, in place of the conventional integral tread there is a wide annular groove or channel having spaced sidewalls. The tread comprises an annular nonstretchable flexible band or belt which snugly fits in the channel between the sidewalls. When the tire is inflated and expands radially outwardly, the nonexpandable tread is securely and firmly held in place in the channel, but it can be removed and replaced when the tire is deflated. The interengaging inner annular surface of the tread member or band and the outer surface or bottom of the tread receiving channel may be formed with complemental, interengaging means or lugs which are forced into interengagement with each other when the annular tread band is fitted into the channel and the tire is inflated to resist relative slippage between the tire and the annular belt tread member.

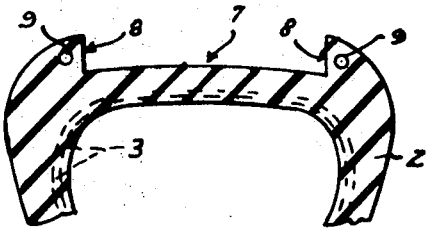
Fig-5
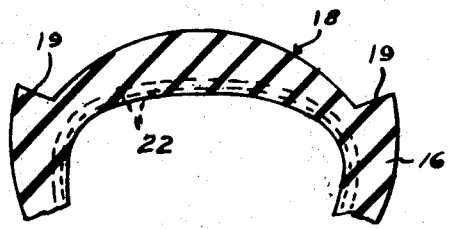
Fig-8
Fig-6
Fig-9
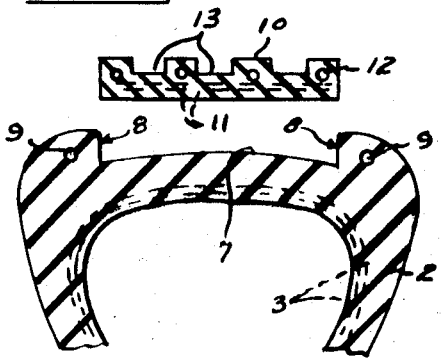
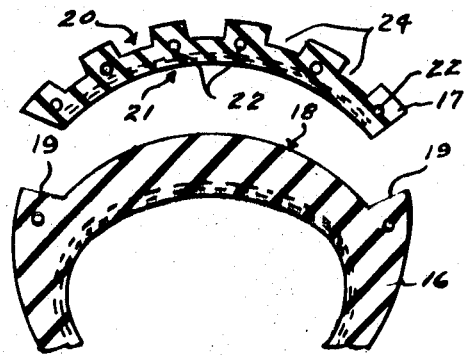
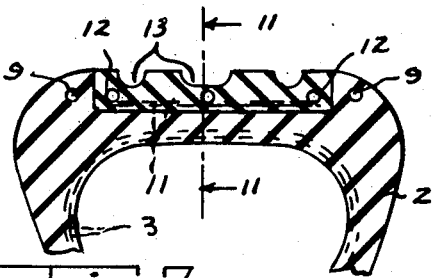
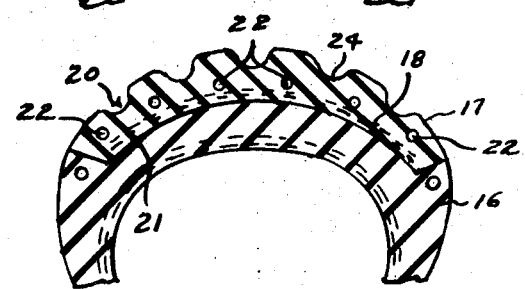
Fig-7
Fig-10
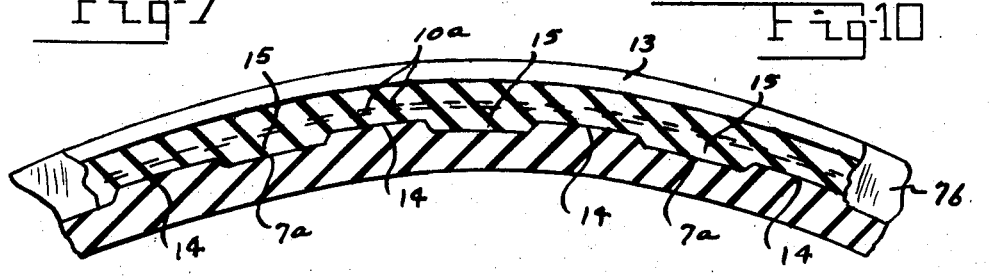
Fig-11
INVENTOR.
AIVARS V. PETERSONS
BY Harry A. Herbert Jr.
and
Charles H. Wagner
ATTORNEYS

REPLACEABLE TREAD ON AN EXPANDING DIAMETER CAR CARCASS TIRE

BACKGROUND OF THE INVENTION

Vehicle tires, especially aircraft tires, are often removed from aircraft, and many other vehicles, because of tread cuts and tread damage, long before the tread portions have been worn out. Most of these tires are scrapped and new tires obtained to replace them long before the useful life of the tire carcass has been utilized. When the treads on ordinary tires have been worn down beyond acceptable limits, they are either scrapped or transported back to a suitable facility to be "retreaded."

The subject invention obviates this waste and delay, and permits the tire carcass to be used, even when the tread has been badly cut, worn or damaged. It enables crews to deflate the cut or worn tread tires, remove the damaged tread and replace the same with a new tread which, upon inflation, is securely held in place on the tire carcass. This can be repeated until the tire carcass life has been used up. New tire procurement, expense and time will be drastically reduced, and tire retreading is eliminated. Logistics costs are also reduced, because instead of shipping whole tires for replacement or retreading, only new treads will have to be sent and replaced.

BRIEF DESCRIPTION OF THE DRAWING

Other objects and advantages of the invention will become apparent from the following description and accompanying drawing in which like reference characters refer to like parts in the several FIGS. thereof.

FIG. 5 is a somewhat schematic sectional view of the expansible tire carcass portion showing the annular tread receiving channel.

FIG. 6 is a sectional view similar to FIG. 5 showing the renewable annular tread portion in position for seating in the tread receiving channel.

FIG. 7 is a view similar to FIG. 6 but schematically showing the tread portion snugly seated in place by inflation and radial expansion of the tire carcass.

FIGS. 8, 9 and 10 are sectional views, similar to FIGS. 5, 6 and 7, but illustrating schematically a slightly modified form of annular tread receiving channel and nonstretchable annular tread member, and FIG. 11 is a sectional view taken about on line 11–11 in FIG. 7 but illustrating a slightly modified interengaging portion between the bottom of the tread band member receiving channel and the inner surface of the nonstretchable tread band.

Figure 1:
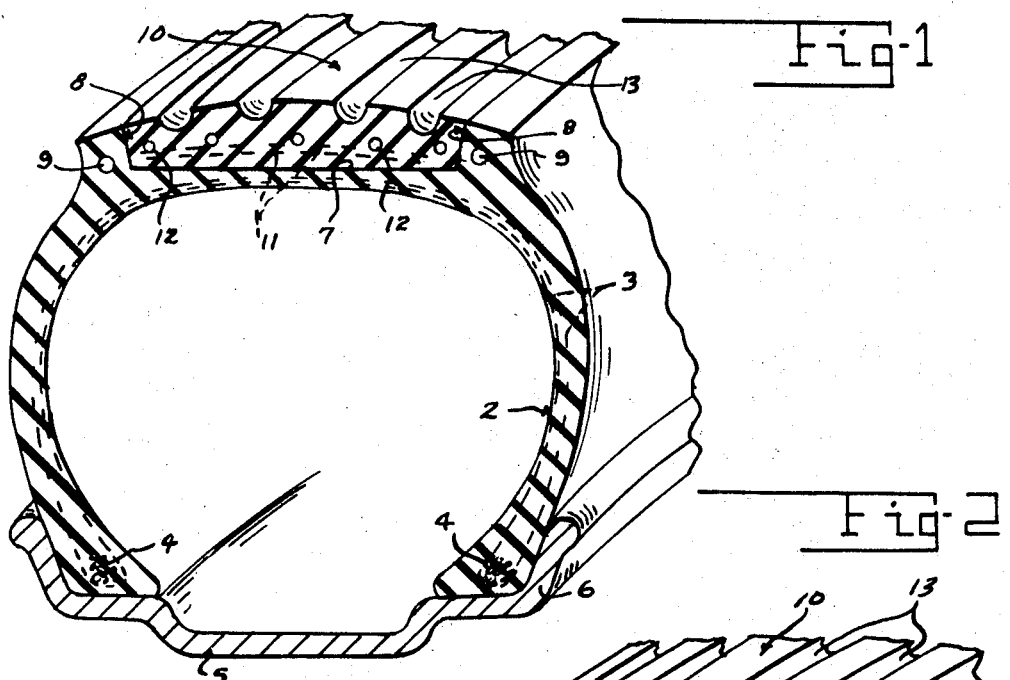
FIG. 1 is a transverse sectional view, partly in perspective, taken through a tire and rim and incorporating the invention, showing the tire inflated with the removable tread therefor in place.

Referring to the drawing, and more particularly to FIGS. 1 to 4, the reference numeral 1 denotes an inflatable tire, made in accordance with the invention, and comprising a resilient flexible and inflatable and radially expandable carcass 2 with suitable fabric reinforcing material 3. The numeral 4 denotes the tire beads of somewhat conventional configuration to seat in a conventional, preferably solid drop center rim 5 and provides adequate air sealing relation between the tire carcass 2 and the rim flanges 6.

The tire carcass 2 is formed with an annular tread receiving wide channel 7, having a width about equal to the conventional width of the usual tire tread.

The tread receiving channel 7 is formed in the carcass 2 with opposite spaced annular walls or retaining abutment surfaces 8 which may be reinforced by suitable annular cables 9, if desired.

The numeral 10 denotes an annular removable tread portion having a tread width to be snugly received in the channel 7 between the annular spaced wall surfaces 8. This tread or belt portion 10 is nonexpansible, and preferably provided with the annular reinforcing layer or layers of fabric 11 and additional cable bands 12. The outer surface of the tread band 10 is preferably made of the usual "tread" rubber and molded with a suitable nonskid design tread 13.

The tire carcass 2 is radially expansible, upon inflation up to at least 15 percent, at least that portion located in the annular channel 7, between the channel sidewalls 8. The belt tread portion 10 is however suitably reinforced by the annular fabric strands 11, and if desired the cables, and therefore is not radially expansible.

Figure 2:
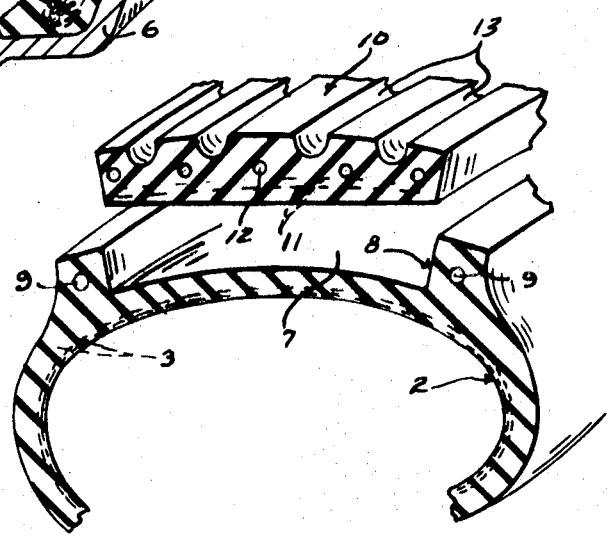
FIG. 2 is a somewhat similar fragmentary sectional view partly in perspective showing the tire deflated with the annular tread band in position above its receiving channel.
Figure 3:
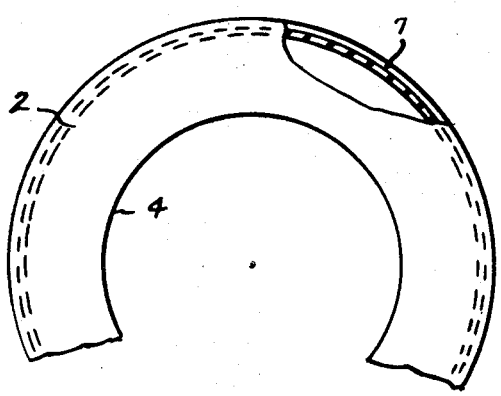
FIG. 3 is a side view of a vehicle tire employed in the invention, parts being broken away to show the tread receiving channel.
Figure 4:
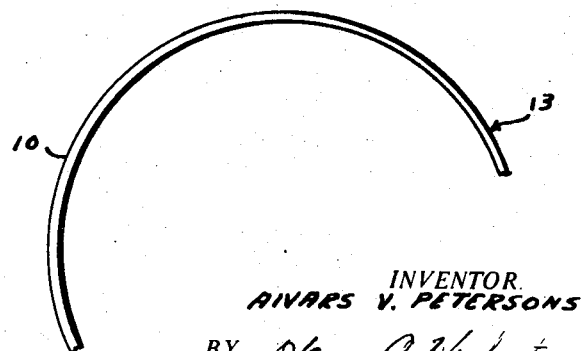
FIG. 4 is a view in elevation of a portion of the annular nonstretchable band portion of the tire, constituting the renewable tire tread portion.

In replacing or renewing the tread portion 10 the carcass is deflated, somewhat similar to that shown in FIG. 2 to permit the tread band portion or belt 10 to be slipped or forced over the periphery of the carcass and into the annular tread receiving channel 7. The inner diameter of the nonexpansible tread member or belt 10 is less than the diameter of the tire carcass when fully inflated, without the tread band 10 in position in the channel 7.

Therefore, with the removable tread belt in position and the tire carcass 2 fully inflated, as seen in FIGS. 1 and 7, the tread becomes firmly and tightly seated in the channel 7, and against the channel sidewalls 8.

When the tread of the tire becomes sufficiently worn, or is cut or damaged, it is only necessary to deflate the tire as seen in FIGS. 2 and 6 and the removable tread portion can be easily pried out of the channel 7 and replaced by a similar new tread band. Upon inflation, the new tread will firmly and tightly seat in the channel 7 with sufficient friction to prevent slippage between the periphery of the carcass 2 and the tread band 10.

Should a more positive interlock between the renewable tread 10 and the carcass 2 be desired, as seen in FIG. 11, the bottom 7a of the channel 7b of the carcass may be provided with annularly spaced driving lug members 14 and the inner surface of the annular renewable tread member or belt 10a may be formed with corresponding or complemental lug members 15 which fit between, and interlock with, the lug members 14 to prevent relative circular movement between the tire carcass 7c and the tread member 10a.

The structure shown in FIGS. 8 to 10 is quite similar to the construction shown in FIGS. 1 to 7 except that the transverse sectional shape of the tire, indicated at 16, and that of the removable or replaceable tread member or band 17 are a little different from that shown in FIGS. 1 to 7.

The tire 16, as shown, is provided with an annular, relatively wide channel 18 with spaced side or abutment walls 19 to snugly receive the wider annular tread member 20 in the channel 18 between the sidewalls 19, the tire carcass 16 being radially expandable, especially between the annular shoulders.

The annular tread member 17 is nonexpandable radially, and its inner surface 21 is curved in cross section to accurately and tightly fit the channel 18 when the tire carcass is inflated. As the tire carcass in inflated, as seen in FIG. 10, the tire expands radially outward against the inner curved portion 21 of the tread member 17 and is securely held in position in the channel 18 between the sidewalls.

The reference numerals 22 denote flexible reinforcing nonstretchable fabrics in the renewable tread band member 17 to resist radial expansion of the tread portion 17 as the tire carcass is inflated.

If desired, suitable flexible reinforcing means 23 may be provided in the tire carcass 17 to limit the amount of radial expansion of the carcass as the same is inflated.

The replaceable or renewable tread band 17 may be made of tough resilient flexible tread material with the outer surface formed or molded to provide an outer suitable nonskid surface, as indicated at 24.

I claim:

1. A vehicle tire comprising an inflatable tire carcass member of stretchable fabric, and having an annular and substantially nonreinforced tread member-receiving channel portion formed in the periphery thereof and a pair of spaced-apart, upraised shoulder portions forming opposite sides, and defining the limits of, the said channel portions; a flexible, resilient and nonstretchable annular tread member dimensioned to a fixed diameter measuring substantially less than that of the expanded diameter of said tire carcass member and further being of a width to thereby snugly seat in said tread-receiving channel portion in tight-fitting relation between said upraised shoulder portions when said tire carcass member is inflated; and reinforcing means built into each of said upraised shoulder portions and providing substantial local resistance to any inflation pressure applied to said tire carcass member to thereby ensure the concentration of a significant proportion of the said inflation pressure and thus the expansion resulting therefrom at the said tread-receiving channel portion to more firmly seal the said tread member in said channel portion.

2. A vehicle tire as set forth in claim 1, wherein said reinforcing means comprises additional, annularly-disposed fabric cable members integrally formed in said upraised shoulder portions of said tire carcass member.